Nov. 30, 1954     G. A. WETTENGEL     2,695,676
ANTITHEFT DEVICE AND SYSTEM FOR MOTOR VEHICLES
Filed July 9, 1951     5 Sheets-Sheet 1
FIG. 1.
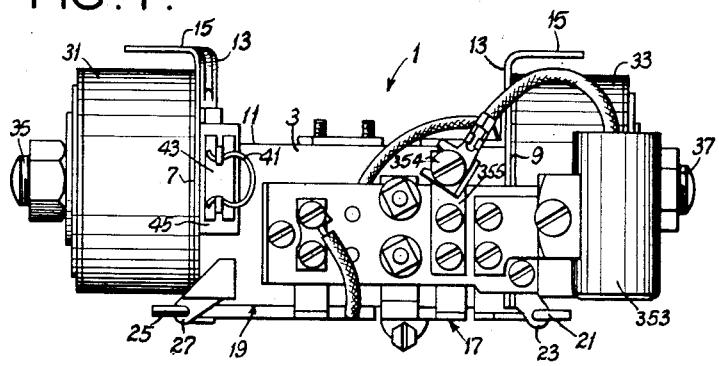
FIG. 2.
FIG. 4.
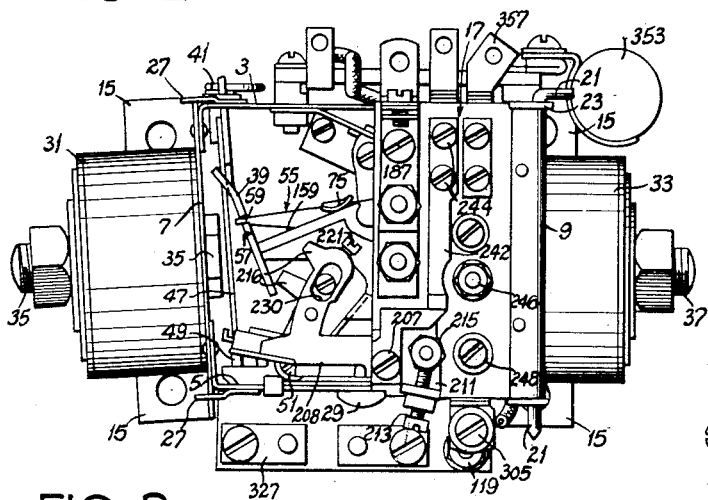
FIG. 3.
George A. Wettengel,
Inventor.
Koenig and Pope,
Attorneys.

Nov. 30, 1954  G. A. WETTENGEL  2,695,676
ANTITHEFT DEVICE AND SYSTEM FOR MOTOR VEHICLES
Filed July 9, 1951  5 Sheets-Sheet 2
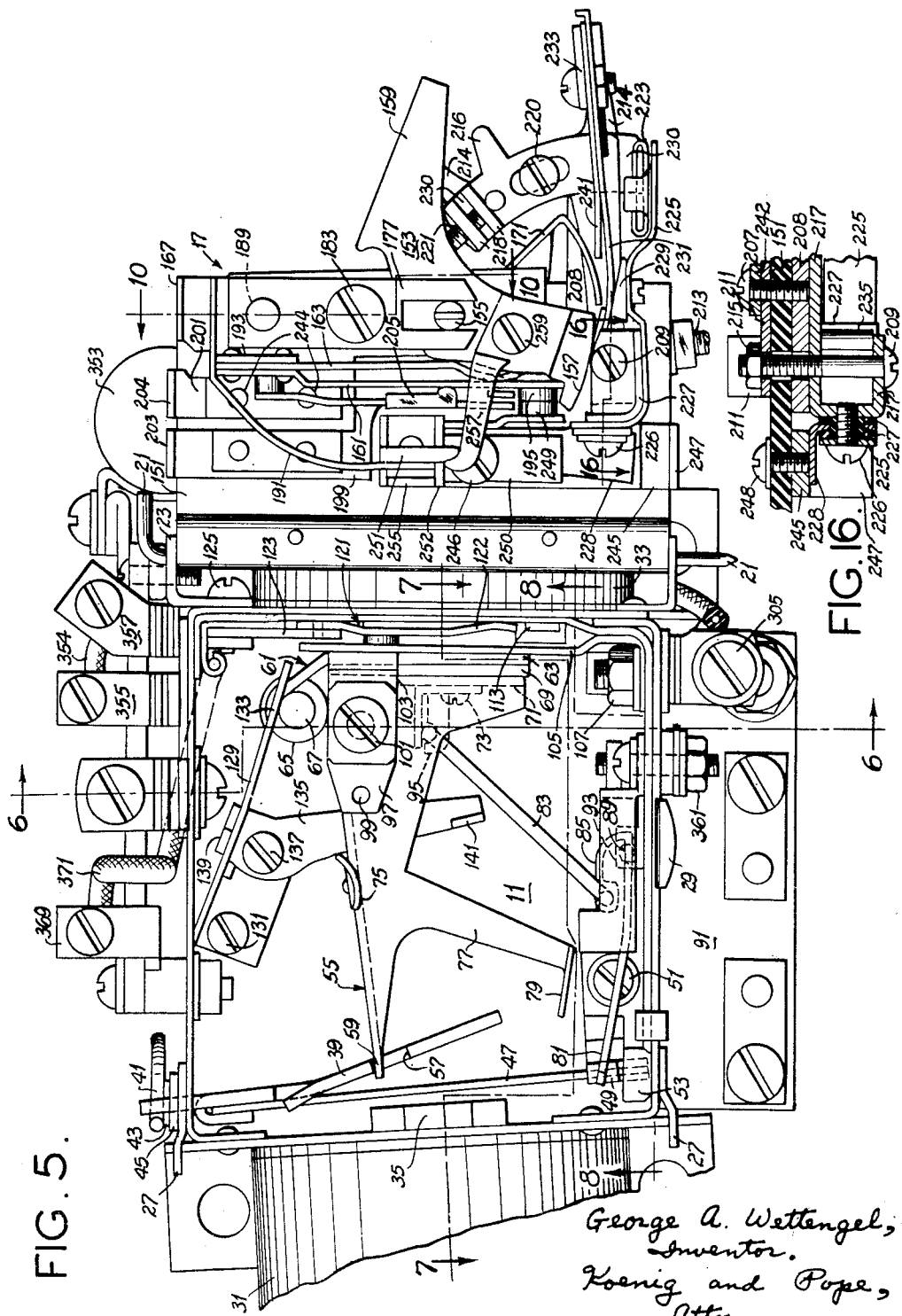
George A. Wettengel,
Inventor.
Koenig and Pope,
Attorneys.

Nov. 30, 1954  G. A. WETTENGEL  2,695,676
ANTITHEFT DEVICE AND SYSTEM FOR MOTOR VEHICLES
Filed July 9, 1951  5 Sheets-Sheet 3
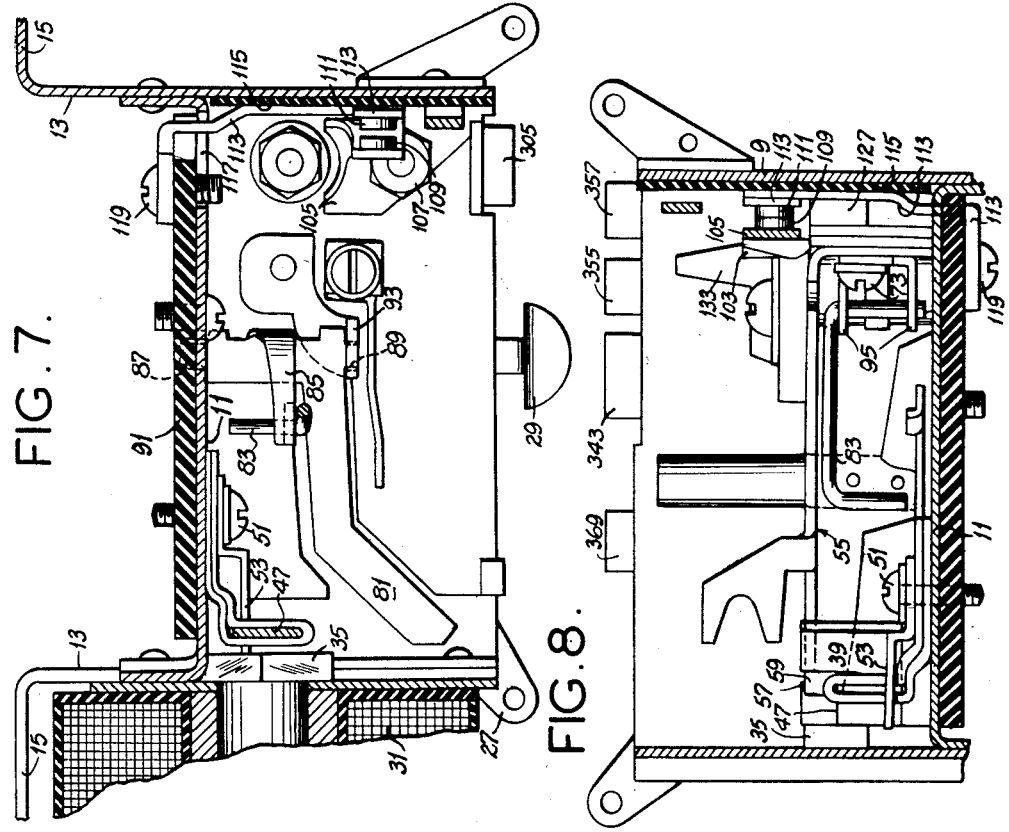
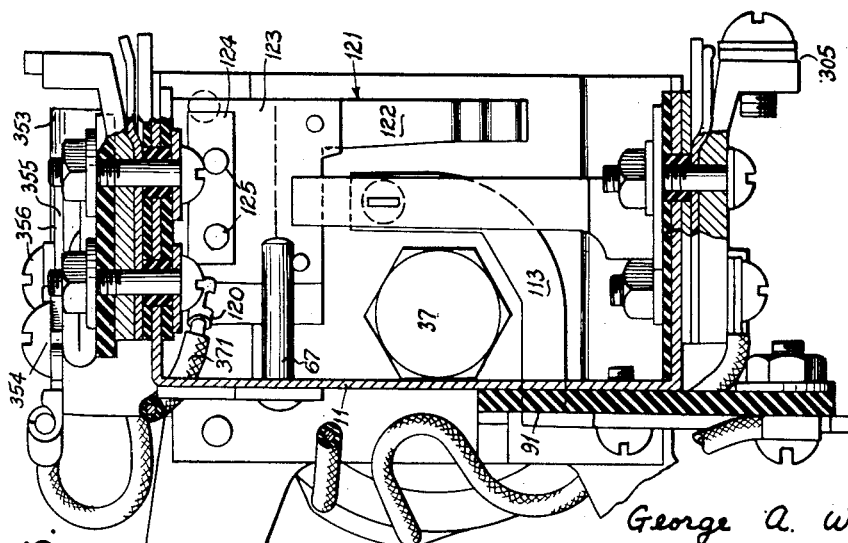
George A. Wettengel,
Inventor.
Koenig and Pope,
Attorneys.

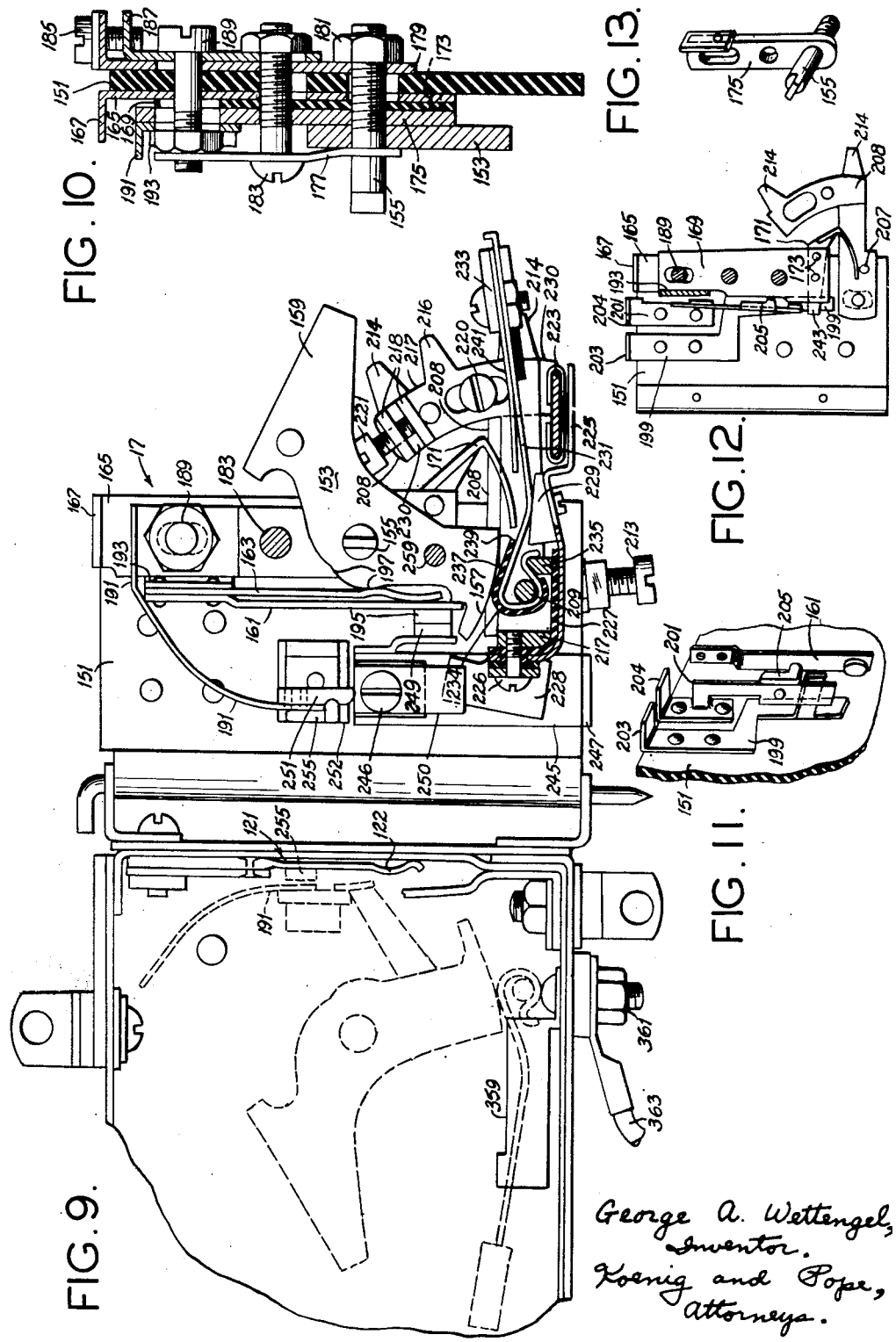

Nov. 30, 1954  G. A. WETTENGEL  2,695,676
ANTITHEFT DEVICE AND SYSTEM FOR MOTOR VEHICLES
Filed July 9, 1951  5 Sheets-Sheet 5
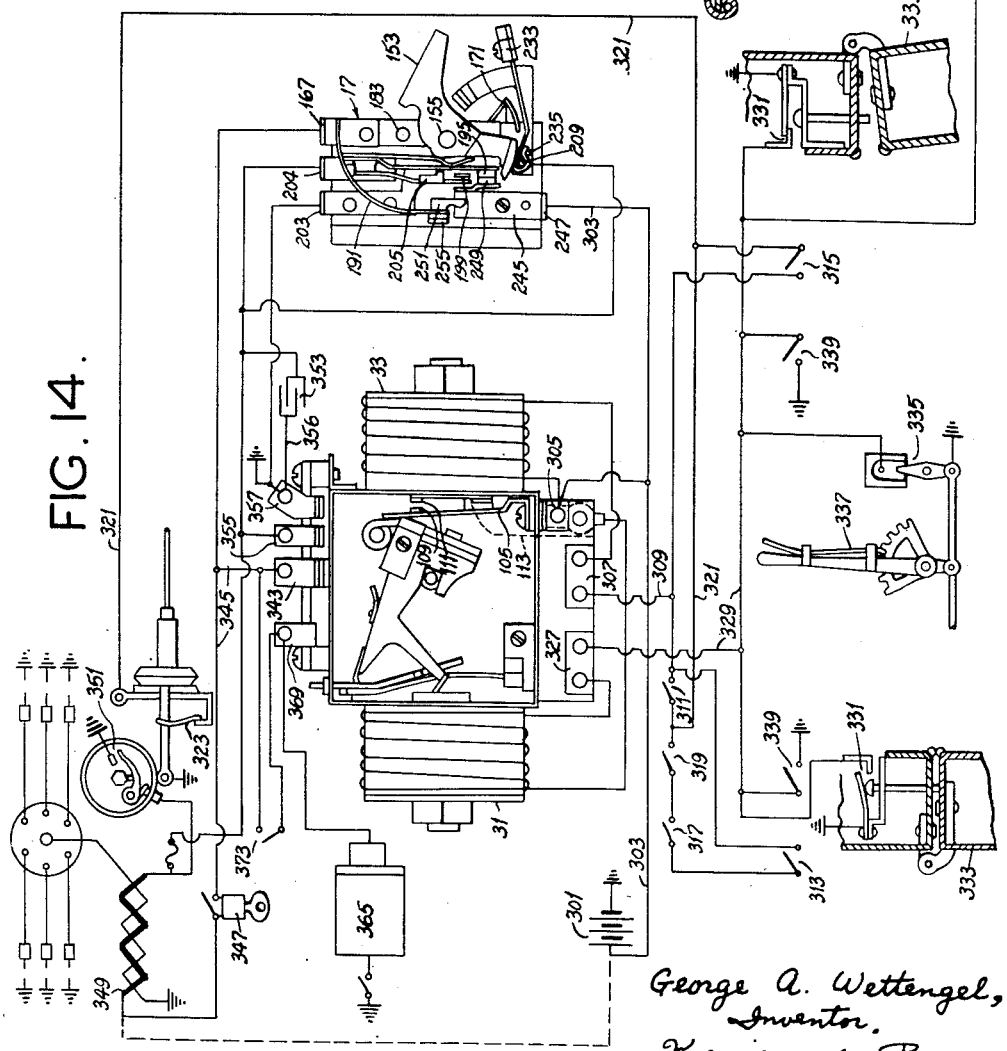
George A. Wettengel,
Inventor.
Koenig and Pope,
Attorneys.

United States Patent Office 2,695,676
Patented Nov. 30, 1954

2,695,676

ANTITHEFT DEVICE AND SYSTEM FOR MOTOR VEHICLES

George A. Wettengel, St. Louis, Mo.

Application June 9, 1951, Serial No. 235,791

20 Claims. (Cl. 180—82)

This invention relates to devices and systems for preventing the theft of motor vehicles, both in the presence and absence of an authorized driver of the vehicle.

Briefly, the invention provides an automatically and manually controlled timer mechanism responsive to movement of a vehicle. An electric control system automatically provides for initiation of a timing cycle when the vehicle is placed in operation. After predetermined movement of the vehicle, certain apparatus controlled by the timer mechanism provides alarm signals in order to disconcert the unauthorized driver and ultimately stops the vehicle. The electric control system additionally includes means for resetting the timer mechanism. Therefore, after initiation of a timing cycle there is a predetermined time interval during which cancellation may be effected by an authorized driver to permit normal operation of the vehicle.

Essentially, the anti-theft device of this invention is a reset timer responsive to movement of the vehicle. There is provided a movable switch-actuating member biased from a latched position to a switch-actuating position. When the latch is released, the switch-actuating member may move under bias toward the switch-actuating position, but the speed of movement is limited by means of a friction braking element responsive to vibrational movement of the device and vehicle. This braking element is of improved construction in that it is relatively unresponsive to the amplitude of vehicle movement so that rough spots in the road will not cause premature completion of a timing cycle. There are in effect two braking surfaces, one of which provides continuous braking action when the braking element is stationary or moves in one direction in response to jarring of the vehicle and the other of which is adapted to provide braking action when the braking element moves in its other direction, but with an adjustable time interval during which the switch-actuating member is released for movement under its bias. Among the features to be noted in connection with the timer mechanism are easy disassembly, convenient adjustment and silent operation.

The electric control system of this invention includes the provision of a latch-release solenoid under the control of a plurality of automatically and manually operated latch-release switches, these switches being so arranged that opening of a door of the vehicle, opening of the hood, release of the brake, or manual operation of hidden buttons will effect initiation of the timing cycle. The timing cycle then carries through to inactivate the vehicle unless stopped by means of a reset solenoid, which is operative to return the switch-actuating member to its latched position. Manually operated reset switches hidden in the vehicle are provided for operation by an authorized driver of the vehicle. After operation of a reset switch, the vehicle may be operated in a normal manner until the latch-release solenoid is again energized.

The apparatus controlled by the timer mechanism includes a light flasher responsive to vibrational movement of the vehicle for providing a visual alarm signal immediately upon initiation of a timer cycle, this visual signal being unapparent from within the vehicle. Additionally, there are switch contacts for intermittently shorting the capacitor and breaker points of the ignition circuit, thereby causing intermittent operation of the engine with attendant backfiring and faulty engine operation. Also, prior to completion of the timing cycle, a switch is closed to ignite a smoke bomb adapted to disconcert an unauthorized driver of the vehicle. Ultimately, upon completion of the timing cycle, main contacts in the primary part of the ignition circuit are opened, and the condenser and breaker points are permanently shorted out.

Because of the intermittent, backfiring operation of the engine during part of the timing cycle, which may damage the muffler at high speeds, a safety switch is provided. Other features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which one of various possible embodiments of the invention is illustrated, Fig. 1 is a top plan view of the anti-theft device of this invention;

Fig. 2 is a front view with a door assembly shown in its closed position;

Fig. 3 is a rear view of Fig. 2;

Fig. 4 is a partial right end view of Fig. 2;

Fig. 5 is an enlarged front view of the device, with the door assembly swung open and with the mechanism shown in a latched position prior to initiation of a timing cycle;

Fig. 6 is a vertical section taken on line 6—6 of Fig. 5, looking to the right inside the housing;

Fig. 7 is a horizontal section taken on line 7—7 of Fig. 5, looking down inside the housing;

Fig. 8 is a horizontal section taken on line 8—8 of Fig. 5, looking up inside the housing;

Fig. 9 is a partial enlarged front view of the device with the door assembly shown in its open position, and with parts removed for clarity;

Figs. 10–13 are detail views of parts of the door assembly;

Fig. 14 is a circuit diagram illustrating electric circuit connections of the anti-theft system of this invention;

Fig. 15 is a partial view of Fig. 14, showing a moved position of parts; and,

Fig. 16 is a horizontal section taken on line 16—16 of Fig. 5.

Similar reference characters indicate corresponding parts throughout the several views of the drawings.

Referring to Figs. 1–13, there is shown a timer mechanism 1 of this invention. The operative parts of this mechanism are housed in a box-like housing having a top 3, a bottom 5, ends 7 and 9, a back member 11 and an open front. This housing is formed of nonmagnetic material such as brass or plastic. Extending from the end walls 7 and 9 are legs 13 provided with feet 15 from mounting the unit upon a suitable wall in the vehicle. An openable door assembly 17 is pivoted at the right end of the front of the housing so as to be swingable to a closed position partially closing the front of the housing. A door panel 19 (Fig. 1) of plastic or the like is pivoted to the left end of the housing to complete closure of the housing. These doors are normally closed, but may be opened for convenience of adjustment and repair.

The door assembly 17 is pivoted upon a removable pin 21 which extends through ears 23 at the top and bottom of the right end wall 9. The door panel 19 is similarly pivoted upon a removable pin 25 which extends through ears 27 on the other end wall 7. Both the door assembly 17 and the panel 19 are maintained in a closed position by a spring latch 29 at the bottom of the housing.

Mounted on the left and right ends 7 and 9 of the housing are solenoid coils 31 and 33, respectively. The solenoids 31 and 33 have magnetic cores 35 and 37, respectively, for actuating certain magnetic armatures within the housing. Herein, these cores are in the form of bolts passed through the end walls of the housing and fastened by nuts at the outer ends of the solenoids.

Referring to Figs. 5, 7 and 8, at the left end of the housing there is a latch-release armature 39 hinged at its upper end to project generally down and alongside the inner end of the solenoid core 35 so as to be movable toward and away from the core 35. The upper end of the armature 39 extends through the top wall 3 and is secured by means of a cotter 41 resting upon a brass washer 43 and a rubber washer 45. Affixed to the top end of the armature 39 inside the housing is a stiff magnetic spring strip 47 which extends downward between the armature and the solenoid core 35 and into a spring adjusting member 49. The spring adjusting member 49 receives the end of the spring strip 47 and is mounted on the rear of the housing by means of a screw 51. A keeper 53, secured by the screw 51, abuts against the end of the spring strip 47 to provide for bending of the spring strip and varying resilience to retraction of the armature 39. Also, the screw receiving aperture in the adjusting member 49 is slotted so as to permit variable spacing of the spring strip relative to the solenoid core 35.

This armature 39 functions as a latch for a pivoted reset member 55, and as such is normally biased by the spring strip 47 away from the core 35. A slot 57 in the armature 39 is cooperable with an end 59 of the reset member 55, so that upon energization of the latch-release solenoid 31 and retraction of the latch-release armature 39, the end 59 is cleared for movement in an upward direction.

This reset member 55 is part of an assembly comprising a magnetic armature 61 having an arm 63 extending along the right-hand side of the housing and having a sleeve-forming portion 65 received over a stud 67 so as to be pivotal thereon. The stud 67 is fixed in the back of the housing. A magnetic plate 69 is fixed to the arm 63 of the armature and the reset member 55 is in turn fastened against the plate 69 by means of a flange 71 and screw 73. As is most clearly shown in Fig. 5, the reset member 55 has a forwardly projecting reset leg 75 at the top and an arm 77 reaching toward the bottom of the housing. A foot 79 extends from arm 77 and is adapted to function as an upper weight-retaining element as will be apparent.

A lower weight-retaining member 81, spaced beneath the foot 79, is driven by the reset member 55 through a link 83. Referring to Figs. 5 and 7, the link 83 is pivoted on an extension 85 formed on the lower weight-retaining member 81 which in turn is pivotally supported by means of tabs 87 and 89. Tab 87 reaches through an aperture in the rear 11 of the housing and through an insulating board 91 fixed to the rear of the housing. Tab 89 is received in a bracket 93 fastened to the bottom 5 of the housing.

Referring to Figs. 5 and 8, the link 83 is pivotally supported on the reset assembly by means of a bracket 95 secured against the flange 71 by the screw 73. The arrangement is such that as the reset member 55 moves in an upward direction (Fig. 5), the lower weight-retaining member 81 is driven in a downward direction.

Mounted upon th etop of the reset member 55 is an insulating part 97 secured pivotally on pin 99 and adjustably fixed by means of a bolt 101 extending through a slot in the insulating member. The insulating part 97 has a shoulder portion 103 facing toward the right end of the housing and abutting against the end of a conductive spring strip 105. The strip 105 is secured to the bottom of the housing by a screw 107 and extends upward on the right-hand side of the housing. Upon the free end of the strip 105 is a contact 109 adapted for cooperation with a contact 111 carried on a conductive strap 113. A sheet 115 of insulating material at the right end 9 of the housing prevents contact of the strap 113 with the housing. The strap 113 extends toward the bottom 5 and then passes rearward through an aperture 117 in the back of the housing and is secured outside the back of the housing by a screw 119 (Fig. 7).

Also located at the right side (Fig. 6) of the housing is a spring strip 121. The strip 121 has a terminal forming portion 120, a forwardly extending central portion riveted to and under a fiber board 123 and a contact arm 122 generally in front of the spring strip 105. A plate 124 is mounted on top the fiber board by screws 125 threaded into the plate through the side wall 9 of the housing.

The reset assembly 55 is normally biased in a clockwise direction on stud 67, as viewed in Fig. 5, by the spring strip 105 and strap 113 cooperating through contacts 109 and 111, strip 105 abutting against the shoulder 103. The member 55 is moved in the opposite direction by retracting force of the reset solenoid 33. A rubber bumper 127 (Fig. 8) is mounted upon the armature 63 so as to engage the right end 9 of the housing and silence retraction of the reset assembly. Additional silencing is obtained by means of a spring friction brake 129 (at the top of the housing) bearing against the sleeve 65. The spring brake 129 is mounted upon the rear of the housing by means of a screw 131 and has an arm 133 extending over the armature at 65 to retain it releasably upon the stud 67. Tension in the brake member 129 is conveniently varied by means of a lever 135 pivoted at 137. The lever 135 has a tongue 139 extending over the top of the brake member 129 and a relatively long arm provided with a grip 141 for moving the arm upon its pivot 137 to increase or decrease the pressure of the brake 129 upon the sleeve 65 of the reset assembly.

In Figs. 5 and 9–13, there is shown a main insulating board 151 upon which certain parts are mounted so as to be swingable out of the housing for convenience of adjustment. Briefly, this assembly comprises a switch-operating member 153 pivoted on a stud at 155 so as to be movable from a latched position shown in Figs. 5 and 14 in a counterclockwise direction to a switch-actuating position shown in Fig. 15. The member 153 is formed from insulating material with an arcuate lower margin 157 and with an outwardly extending arm 159 cooperable with the leg 75 on the reset member 55 when the door assembly is in its closed position (Fig. 2). When the reset solenoid 33 is energized, the reset member 55 is driven downward and the switch-operating member 153 is swung into its latched position, where it is retained by a flexible braking element (to be described). This braking element is adapted to be responsive to vibrations of the vehicle in order intermittently to release the switch-operating member 153. During such release, the member 153 is moved in a counterclockwise direction (as viewed in Fig. 5) under the bias of four spring strips (161, 163, 191 and 201). As the operating member 153 moves in a counterclockwise direction certain switches are actuated, as will be apparent.

Referring now more particularly to Figs. 9–13, the insulating board 151 carries on its inner face an elongate terminal member 165 having an inwardly directed tongue 167 at its top. A fiber sheet 169 lies against the terminal member 165 and has a contact bracket 171 riveted at 173 to its lower end below the terminal 165. A stud holder 175 is faced against the fiber sheet 169, and this holder 175 (shown in Fig. 13) has the stud 155 fixed therein at its lower end. The switch-actuating member 153 is pivoted on this stud 155 and held thereon by a spring braking member 177 shown in Figs. 5 and 10. The stud 155 also extends through elongate apertures in the fiber board 151 and the terminal member 165, so as to be vertically movable with respect thereto, and through a backing plate 179 on the outer face of the board 151 where it is secured by a nut 181. A bolt 183 extends through the members 177, 175, 169, 165, 151 and 179 and is also movable vertically with respect to the board 151 and terminal 165. This bolt 183 retains the braking member 177 against the face of the switch-actuating member 153 and permits variation in the frictional braking effect on the switch-actuating member 153. The arrangement is such that the switch-actuating member 153 may be adjusted vertically with respect to the fiber board 151.

This vertical adjustment is facilitated by a set screw 185 threaded in a vertical direction into a member 187 on the outer face of the backing plate 179. Stud 155 and screw 183 are relatively immovable with respect to the backing plate 179 so that vertical movement thereof results in vertical adjustment of the pivoted switch-actuating member 153. Member 187 is immovably secured to the fiber board 151 by a screw 189. The screw 189 also carries a switch member 191 which is in conductive relation with the terminal 165, and the screw 189 extends through elongated apertures in the stud holder 175 and switch member 191 so as to be relatively movable with respect to these parts.

The terminal member 165 also has a flange 193 extending at right angles to the board 151 and onto which are attached the spring strips 161 and 163. Strip 161 is in conductive relation with the terminal 165 and carries a contact 195 at its lower end. The spring strip 163 backs the strip 161 and cooperates with a marginal portion 197 of the switch-actuating member 153 which is adapted to afford snap action to the opening of contact 195. As will be noted in Figs. 14 and 15, the lower portion of the spring backing strip 163 is of specially curved nature to afford such snap action, and since the adjustment for proper snap action is delicate, the vernier adjustment by means of set screw 185 is desirable.

Referring more particularly to Figs. 5, 11 and 12, the insulating board 151 carries a switch formed by conductive members 199 and 201. These switch members 199 and 201 have inwardly directed tongues 203 and 204, respectively, at their upper ends and are formed at their lower end to engage one another. The member 201 has an insulating knob 205 which abuts against the spring strip 161 (Fig. 5) so as to be movable thereby.

Referring now to Figs. 12 and 16, there is shown a screw 207 which pivotally fastens a lever 208 to the lower corner of the door assembly. A frame member 217 is pivotally carried by the lever on a pivot bolt 209, which is tightly received through the lever 208 and through a U-shaped portion of the frame. The end of the bolt 209 extends through larger openings in the board 151 and in a bracket 211 affixed to the outer side of the board. A set screw 213 is threaded in the bracket 211 radially against a nut 215 on the end of the bolt 209 (Fig. 2). The arrangement is such as to provide for fine positioning of the lever 208 on its pivot 207. The frame member in turn is adjustably positioned on its pivot 209 relative to the lever 208 by means of finger grips 214 and 216 on members 208 and 217, respectively. A locking screw 220 is provided to fix the members 208 and 217.

Sandwiched between members 208 and 217 at their free ends is a contact member 230 having a contact 223 secured to and insulated from a tongue struck out from the member 230. The contact member 230 is adjustably positioned on member 217 by means of a set screw 221 cooperating with ears 218. This contact 223 is adapted for cooperation with a contact strip 225 affixed at 226 to the U-shaped portion of the frame 217. The contact strip 225 is insulated at 227 from the frame member and has an ear 228 adapted to make sliding contact with a terminal to be described. The arrangement is such that the spacing between contact 223 and strip 225 may be readily controlled by the set screw 221, and these members 223 and 225 form a first intermittently operative switch.

A wedge block 229 of insulating material is adjustably fixed to the upper side of the contact strip 225 for cooperation with a spring braking element 231. The spring braking element 231 has an insulated weight 233 adjustably positionable upon one end and has a hook 234 shaped at its other end. The hook 234 is loosely looped around the bolt 209 and is bent over a fulcrum 235 extending across the U-shaped portion of the frame.

To prepare the device, the lever 208 is adjusted by means of set screw 213 and the frame 217 is adjusted by fingergrips 214 and 216 so as to locate the bolt 209 slightly out of contact with the hook 234 of the spring braking element 231. The spring braking element is then supported upon the fulcrum 235 and held by engagement with the lower arcuate margin 157 of the switch-actuating member 153, the weight 233 providing braking bias. The outer surface of the hook part 234 may be covered with frictional material 237 to facilitate this gripping action.

The contact member 230 is adjusted relative to the frame 217 by means of the set screw 221 so that the contact 223 is slightly out of engagement with the spring contact strip 225 when the spring contact strip 225 is held in position by engagement of the wedge block 229 with the braking element 231. Therefore, when the braking element moves upward, the contact strip 225 engages the contact 223. Also, the hook part 234 of the spring breaking element pivots on fulcrum 235 in a downward direction to clear the arcuate lower margin 157 of the switch-actuating member 153 and permit movement thereof under the bias of spring strips 161, 163, 191 and 201. As the weight 233 on the spring braking element continues to move upward, a portion 239 thereof immediately adjacent the hook part 234 but on the other side of the fulcrum 235 engages the lower surface 157 of and brakes the switch-actuating member 153. The time interval in upward movement of the spring braking member 231, during which the switch-actuating member 153 is free to move, is determined by the upward elevation of the fulcrum 235 which is carried by the frame 217 and is therefore determined by adjustment of set screw 213. Further adjustment, of course, will be had by varying the pressure of the spring braking plate 177 bearing against the flat surface of the switch-actuating member 153 at the pivot 155.

An additional intermittently operative switch is provided by a conductive strip 241 mounted on top of the spring braking member 231 for intermittent contact with the contact bracket 171. As mentioned heretofore, the bracket 171 is secured between insulators 151 and 169, and the member 171 extends from between the insulators at 243 so as to contact the switch member 199 (Fig. 12). On upward movement of the spring braking member 231, the conductive strip 241 contacts the conductive member 171. These members 241 and 171, being formed of spring material, also facilitate oscillation of the spring braking member.

Referring to Fig. 2, there is shown a conductive strap 242 mounted on the back of the door assembly so as to extend from two conductive supporting screws 244 for the conductive member 201 downward to the screw 207, thereby providing an electrical connection from switch member 201 to the lever 208, frame 217 and through the conductive fulcrum 235 to the spring braking element 231.

Referring to Figs. 14 and 15, a terminal member 245 having an inwardly directed tongue 247 at its lower end is secured to the lower portion of the door by upper end lower screws 246 and 248, and this terminal carries a contact 249. The contact 249 is adapted to cooperate with the contact 195 on spring strip 161. The lower screw 248 is threaded into the terminal 245 in order to leave a clean surface for wiping contact of the ear 228 on the contact strip 225.

The upper screw 246 also secures a plate 250 over the ear 228 to insure a good electrical connection between the terminal 245 and the contact strip 225.

Mounted above the terminal 245 and insulated therefrom at 252 is a bracket having a tongue 255 adapted to make contact with the switch member 191 extending down from the top of the door assembly. An insulating knob 251 is affixed to the lower end of the switch member 191 and an arm 257 (Fig. 5) is secured by a screw 259 to the switch-actuating member 153 so that the arm extends over to the insulating knob 251 to hold the part 191 out of contact with the tongue 255 when the switch-actuating member 153 is in the latched position of Fig. 14. As the switch-actuating member 153 moves to the switch-actuating position of Fig. 15, the arm 257 is withdrawn so that the switch member 191 springs over into contact with the tongue 255. The knob 251 is adjustable longitudinally with the strip 191 on screw 189 to vary the time at which 191 is released relative to the movement of the switch-actuating member 153. Preferably, member 191 is released at some time prior to completion of the timing cycle at which the member 153 releases the spring strips 161 and 163 to open the contacts 195 and 249.

The electric system of this invention is shown in Fig. 14 to comprise the customary battery 301 of the vehicle. A conductor 303 connected to the positive terminal of the battery leads to a terminal 305 at the bottom of the housing. A circuit for energizing the reset solenoid 33 is provided from this terminal 305 to the solenoid 33 and from the solenoid to a terminal 307 at the bottom of the housing. A conductor 309 leads from terminal 307 to switches 311, 313 and 315. Switch 313 connects through switches 317 and 319 with a conductor 321 and switches 311 and 315 connect directly with the conductor 321. This conductor 321 in turn is grounded through a normally closed switch 323 actuated by the usual automatic spark advance (vacuum manifold type being shown) so as to prevent reset operation above a predetermined speed. The purpose of this switch 323 is to prevent reconnection of the ignition circuit at high speeds after it has been disconnected by the anti-theft device. When the device cuts out the ignition circuit, the engine will continue to be driven by movement of the vehicle, forcing unburnt gas into the exhaust pipe. If the ignition circuit is then energized a backfire will result which may damage the muffler system at high speeds.

The switches 311 through 319 are hidden manual control switches adapted to be operated by an authorized driver of the vehicle. There may be one switch such as 311; or two switches 311 and 315 on opposite sides of the vehicle seat; or there may be three series-connected switches such as 313, 317 and 319, all of which must be operated before reset operation can be obtained.

A circuit for energizing the latch-release solenoid 31 includes the terminal 305, the contact strip 105 actuated by the reset member 55, the contact 109 on the strip 105, and the contact 111 on the conductive strap 113. This strap reaches through the rear of the housing to a binding post 119 (Figs. 3 and 8) to which the solenoid winding 31 is connected. The latch-release circuit then extends from the solenoid 31 through a screw 325 (Fig. 3) to a terminal 327 and thence to a conductor 329 leading to parallel-connected switches 331, 335, 339 and 341. Switches 331 are closed automatically by opening of vehicle doors 333; switch 335 is closed upon setting a vehicle hand brake 337; and switches 339 are manually operated. The switch 341 is mounted upon a hood 342 so as to be closed when the hood is raised. Therefore, the latch may be released automatically by opening of either vehicle door 333, by setting of the brake 337 or by opening of the hood 342. Additionally, the latch may be released by manual actuation of switches 339 in the event of a kidnaping. Each of the switches 331, 335, 339 and 341 is grounded to complete the circuit. It will be noted that the circuit through the latch-release solenoid 31 is interrupted at contacts 109 and 111 after unlatching of the reset member 55, thereby preventing prolonged energization of the winding.

The controlled part of the system includes at the bottom of the door assembly 17, the terminal 245 which cooperates at tongue 247 with the live terminal 305 when the door assembly is closed. The circuit is continued through the contacts 249 and 195, the spring strip 161 and the terminal 165 having the tongue 167. This tongue 167 cooperates with a terminal 343 at the top of the housing when the assembly 17 is closed. Terminal 343 is connected by a conductor 345 through a key-operated ignition switch 347 to a primary winding 349 of the usual ignition coil. The primary winding is then grounded through a breaker switch 351. A capacitor for by-passing the breaker switch is shown at 353, as removed from the distributor of the vehicle and mounted upon the housing (Figs. 1 and 2).

The primary winding 349 is also connected to a terminal 355 on the top of the housing. The capacitor 353 is connected at 354 to this terminal 355 (Figs. 1 and 6) and is grounded at 356 to a grounded terminal 357 (Figs. 1 and 5). Terminal 355 cooperates with the tongue 204 of the switch member 201 on the door assembly 17. The grounded terminal 357 at the top of the housing cooperates with the tongue 203 of the other switch member 199, thereby providing a circuit by-passing the capacitor. Normally, switch members 199 and 201 are held in the open position by the switch-actuating member 153, but the circuit is closed at the end of a timing cycle.

It will also be noted that the switch member 199 is connected through the bracket 171 for closure with contact strip 241 upon movement of the spring braking member. As mentioned heretofore, the spring braking element 231 is electrically connected through the fulcrum 235, frame 217, lever 208, a screw 207 and the conductive strap 242 to the other switch member 201. Therefore, during the timing cycle, the capacitor 353 will be intermittently shorted out at 171 and 241; and at the end of the timing cycle will be permanently cut out by direct contact between switch members 199 and 201.

The intermittently operated switch formed by contact 223 and strip 225 is adapted for operating exterior lights. When the door assembly is closed, the contact 223 on the member 230 contacts a bracket 359 mounted at the bottom of the housing (Fig. 9). This bracket 359 is connected at 361 to a conductor 363 (Fig. 9) which leads to signal lights (not shown) on the outside of the vehicle. These lights are intermittently energized from the live terminal 245 on the door assembly through the ear 228 of the spring contact strip 225, the latter cooperating with the contact 223, upon upward movement of the spring-braking element 231.

Additionally, there is provided a circuit for operating a smoke bomb 365 which may be mounted in a suitable location in the vehicle. The smoke bomb may be of any conventional make having the usual electrical filament (not shown) which is electrically heated. The smoke bomb is connected to a terminal 369 at the top of the housing. The terminals 305, 343, 355 and 357 on the housing are of the knife clip type adapted to receive the tongues 247, 167, 204 and 203, respectively, when the door assembly is closed. Their construction is conventional, as shown most clearly in Fig. 6. A conductor 371 extends from the terminal 369 through the rear of the housing (Figs. 3, 6, and 9) for connection to the spring arm 121 along the right side of the housing. This spring arm 121 contacts the tongue 255 on the door assembly 17 when the latter is closed, so that a circuit is established through the switch member 191 from the terminal 165 on the door assembly. Terminal 165 is normally connected through the main contacts 195 and 249 to the battery. The contacts 255 and 191 are normally held open, but are closed during the timing cycle prior to opening of main contacts 249 and 195. The bomb 365 may also be set off by a hidden manual control switch 373 (Fig. 14) connected across the terminals 343 and 369.

It will be understood that various elements of the device (with exceptions noted) should be made of non-magnetic material, such as brass or stainless steel, if their operation is not to be influenced by the solenoids.

Operation is as follows:

Assume the device is initially in its latched condition. When any one of the switches 331, 335, 339, or 341 is closed as by opening of the door 333, setting of the hand brake 337, or opening of the hood 341, a circuit is established from the battery 301 to the latch-release solenoid 31. The associated armature 39 is drawn back against the bias of spring strip 47 to clear the end of the reset member 55. The reset member is biased upward by the spring strip 105, and the contacts 109 and 111 open to deenergize the latch-release solenoid.

As the reset member pivots upon the pin 67, the foot 79 is elevated and the weight-retaining member 81 is driven downward to clear the weight 233 on the spring braking element 231 for movement in response to jars, as upon movement of the vehicle down a road. Also, the leg 75 upon the reset member 55 swings upward so that the arm 159 on the switch-actuating member 153 is free to move. No movement of the switch-actuating member occurs until the vehicle is driven. Hence, properly speaking, the timing cycle does not begin until the vehicle is put into movement.

In the case of an authorized driver, one of the reset switches 311, 315, or all of the series-connected reset switches 313, 317 and 319 are actuated so that the reset member is drawn back to its latched position by the solenoid 33. It will be observed that the latch release relay must be deenergized; that is, the doors must be closed and the brake released. The vehicle then may be operated in the normal manner without interference from the anti-theft device. It will be noted the reset operation may be accomplished at any time, for example, prior to completion of the timing cycle. A suitable warning will be given prior to completion of the timing cycle by backfiring from intermittent operation of the ignition system.

In the event an unauthorized driver attempts to operate the vehicle, the timing cycle will carry on to completion. As the spring braking element 231 moves downward, it pivots on the fulcrum 235 so that the hook 234 continues to bear against the lower margin 157 of the switch-actuating member 153. No movement of member 153 occurs during downward movement of the braking member 231. As the weighted end of the braking member 231 moves upward, the hook 234 thereof swings downward on one side of the fulcrum 235 and the portion 239 thereof swings upward into contact with the lower margin 157 of the member 153. There is a brief period during which the switch-actuating member 153 will move a small distance. Therefore, many oscillations of the braking member are required before the switch-actuating member completes its movement to the switch-actuating position shown in Fig. 15. The length of the timing cycle may be adjusted as described before.

As the braking member oscillates, the contact strip 225 follows the oscillation to open and close upon the contact 223, thereby intermittently closing the lighting circuit from conductor 263 to provide a visual indication of theft. Also, the capacitor 353 is intermittently shorted out by the contact at 171 and 241. This will result in the backfiring of the vehicle and an audible signal is given.

At a time prior to the completion of the timing cycle, the arm 257 mounted on the switch-actuating member 153 (Fig. 5) will move downward to a position wherein the switch member 191 is cleared so that it swings over into engagement with the tongue 255, thereby completing a circuit to the smoke bomb 365. This bomb will then be ignited, to the further inconvenience of the unauthorized driver. Ultimately, the member 153 reaches a position wherein its marginal portion 197 releases the spring strip 163 so that the contacts 195 and 249 open with snap action. The ignition circuit is therefore interrupted at these contacts. Also, the switch members 199 and 201 close to short out the capacitor 353 permanently. Shorting of the capacitor prevents operation of the vehicle by a jumper from the positive terminal of the battery to the primary winding of the ignition coil.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. An anti-theft system for a vehicle such as an automobile or the like, comprising a reset timer mechanism, means operated by the reset timer mechanism at the end of its time cycle and adapted to prevent operation of the vehicle when actuated, a latch for preventing operation of the reset timer mechanism, a latch-release solenoid for releasing the latch to effect initiation of a timing cycle, a solenoid energizing circuit including at least one normally open switch, this switch being arranged for automatic closure preparatory to operation of the vehicle by an unauthorized driver, a reset solenoid for returning the reset timer mechanism to its latched position upon energization of the reset solenoid, and an energizing circuit for the reset solenoid including at least one normally open switch, this switch being hidden and adapted for manual operation by an authorized driver of the vehicle.

2. An anti-theft device for a vehicle such as an automobile or the like, comprising a movable switch-actuating member normally biased from a latched position to a switch-actuating position, switch contacts operated by the switch-actuating member adapted upon actuation to prevent operation of the vehicle, a spring braking element normally braking the switch-actuating member, the braking element being adapted for oscillating motion and intermittent release of the switch-actuating member in response to movement of the vehicle, a movable reset member normally biased from a latched position to a released position and preventing movement of the switch-actuating member when in its latched position, a latching member for latching the reset member in its latched position, a reset solenoid for moving the reset member from the released to the latched position, and a latch-release solenoid for unlatching the reset member.

3. A device as set forth in claim 2 further including normally open switch contacts connected in a circuit for the latch-release solenoid, these contacts being operated by the reset member and being closed when the reset member is in its latched position.

4. A device as set forth in claim 2 further including movable retaining members for the braking element, the retaining members being driven by the reset member upon unlatching of the reset member from first positions preventing movement of the braking element to second positions clearing the braking element for oscillating motion.

5. An anti-theft device for a vehicle comprising a housing and an openable door assembly for the housing, a reset member pivoted on the housing and normally biased from a latched position to a released position, a latching member pivoted on the housing and adapted for latching the reset member, a reset solenoid for moving the reset member against bias from the released to the latched position, a latch-release solenoid for actuating the latching member to release the reset member, a movable actuating member carried by the door assembly and normally biased from a latched to an actuating position, means actuated by the actuating member and adapted to prevent operation of the vehicle when actuated, said actuating member cooperating with the reset member when the door assembly is closed so as to be movable therewith, and means permitting gradual progression of the actuating member from the latched to the actuating position after unlatching of the reset member.

6. An anti-theft device as set forth in claim 5 wherein the means permitting gradual progression of the actuating member comprises a braking element pivoted on the door assembly and normally biased against the actuating member, this braking element being mounted for oscillating motion away from the actuating member to release intermittently the actuating member in response to jarring of the anti-theft device as upon movement of a vehicle.

7. In an anti-theft device for a vehicle, a reset timer mechanism comprising a pivoted member biased for movement from a first position to a second position, braking means operable on the pivoted member and adapted for intermittently releasing said member in response to jarring as upon movement of the vehicle comprising a spring braking element weighted at one end and normally bearing at its other end against the pivoted member, the spring braking element being mounted upon a fulcrum located adjacent the pivoted member so that oscillating movement of the braking element will result in alternately bringing portions of the braking element on opposite sides of the fulcrum into braking engagement with the pivoted member, the pivoted member thereby being released for movement under its bias only during an intermediate part of each swing and being braked at the ends of each swing of the braking element, and anti-theft means operable by said pivoted member in response to its movement from first to second position.

8. An anti-theft device as set forth in claim 7 wherein the fulcrum for the spring braking element is mounted upon a movable frame, this frame being adjustably positionable with respect to the pivot of the pivoted member to permit variation in the time the pivoted member is released during the swings of the braking element, thereby providing for variation in the rate of motion of the pivoted member.

9. An anti-theft device as set forth in claim 8 wherein one end of the braking element is loosely looped around a bolt carried by the frame and then hooked over the fulcrum, the frame being pivotally mounted with the fulcrum located intermediate the pivotal mounting of the frame and said bolt.

10. In an anti-theft device of the type described, an insulating board forming a main support, an assembly of relatively slidable members fixed to the main support and carrying an adjustably positionable pivot stud, an actuating member pivoted on the stud, anti-theft means actuated by said actuating member, a pair of switch contacts one of which is carried by a spring strip, the actuating member being adapted to actuate the spring-mounted contact, a lever pivoted upon the main support and carrying a frame, a fulcrum on the frame, a spring braking element resting upon said fulcrum and normally having a braking engagement with the actuating member, and a second pair of switch contacts one of which is carried by a lever and the other of which comprises a spring member mounted on the frame and biased into engagement with the braking element.

11. An anti-theft device for a vehicle comprising a reset member biased from a latched position to a released position, a latch for holding the reset member in its latched position, control means for actuating the latch, second control means for returning the reset member to its latched position, a pivoted actuating member driven in one direction by the reset member when the latter is returned to its latched position, said actuating member being biased for movement in the other direction to an actuating position, a brake normally braking the actuating member to prevent movement thereof when the reset member is unlatched, the brake being responsive to movement of the vehicle and adapted to release the actuating member for movement when the vehicle is moved, and means actuated by the actuating member adapted to stop the vehicle when actuated.

12. An anti-theft device as set forth in claim 11 wherein the brake comprises a spring strip mounted for oscillating motion into and out of engagement with the actuating member, the actuating member thereby being intermittently released during oscillation of the brake.

13. In an anti-theft device for a vehicle, timing mechanism adapted to be operated by jarring of varying intensity comprising a pivoted actuating member biased from a first position to a second position, said actuating member having an arcuate marginal brake surface, a braking element of spring material cooperating with said brake surface, said braking element being mounted upon a fulcrum and having a braking area on one side of the fulcrum normally biased toward the brake surface of the actuating member and having a braking area on the other side of the fulcrum normally biased away from the brake surface of the actuating member, a weight attached to the braking element adapted to pivot the braking element on its fulcrum in response to jarring of the device, thereby causing the two braking areas of the braking element alternately to engage the brake surface of the actuating member with intermediate intermittent release of the actuating member, and anti-theft means operable by said actuating member in response to its movement from first to second position.

14. An anti-theft device as set forth in claim 13 further including a member located adjacent the fulcrum, the braking element being loosely hooked over said member.

15. In an anti-theft system for automotive vehicles having an ignition circuit and a capacitor therefor, a reset timer mechanism including a switch-actuating member movable from a latched initial position to a final position, a first switch opened by the switch-actuating member at the end of the timing cycle for interrupting the ignition circuit, a second switch closed by the switch-actuating member at the end of the timing cycle for shorting the capacitor, and a third switch for intermittently shorting the capacitor during the timing cycle, a spring braking element mounted for oscillatory movement during movement of the vehicle after initiation of the timing cycle, said third switch being intermittently operated by the oscillating movement of said spring braking element during the timing cycle.

16. In an anti-theft device of the type described, a main support, a pair of switch contacts mounted upon the support and normally biased open, a switch-actuating member pivoted upon said support alongside one of the switch contacts for movement from a first position to a second position, the switch-actuating member having a portion adapted normally to bear against one of the contacts to maintain it closed upon the other contact and to release said contact suddenly when the switch-actuating member moves to its second position, means for adjustably positioning the pivot of the switch-actuating member with respect to the switch contacts in order to provide proper switch actuation, anti-theft means operable by said switch-actuating member in response to its movement from first to second position, and a spring braking element mounted upon the support for braking cooperation with the switch-actuating member, the spring braking element being carried by a frame and the frame being adjustably positionable on the support in order to vary the braking action of the braking element on the switch-actuating member.

17. An anti-theft device as set forth in claim 16 further including a second pair of switch contacts one of which is moved by the spring braking element and the other of which is adjustably carried by the frame for the braking element, both contacts being movable as a unit during positioning movement of the frame relative to the main support.

18. An anti-theft device as set forth in claim 17 further including a lever pivoted on the main support, the frame being pivoted on the lever, one of the second pair of switch contacts being carried by the lever and the other being constituted by a spring strip mounted on the frame to extend alongside the braking element, and means cooperating with the spring strip and the braking element to cause movement of the former in response to movement of the latter.

19. An anti-theft system for an automotive vehicle comprising a switch for controlling operation of the vehicle, a resettable timer mechanism comprising a member for actuating said switch movable from a retracted position to a switch-actuating position and vibratory means acting in response to movement of the vehicle for controlling the movement of said member to switch-actuating position, a reset member for resetting the switch-actuating member to its retracted position from either its switch-actuating position or any intermediate position, said reset member being movable from a retracted position to a resetting position, electrically actuated means controlling the reset member connected in a circuit including a hidden switch for operation by an authorized driver of the vehicle, a latch for latching the reset member in its retracted position, and electrically actuated means controlling the latch connected in a circuit including at least one normally open switch adapted for automatic closure preparatory to operation of the vehicle by an unauthorized driver.

20. An anti-theft system as set forth in claim 19 further including means operated by the reset member for preventing vibration of the vibratory means when the reset member is in retracted position.

References Cited in the file of this patent

UNITED STATES PATENTS

| Number | Name | Date |
|---|---|---|
| 1,058,166 | Evans | Apr. 8, 1913 |
| 1,198,572 | Petersen | Sept. 19, 1916 |
| 1,305,352 | Gettell | June 3, 1919 |
| 1,630,284 | Wettengel | May 31, 1927 |
| 1,729,800 | Scott | Oct. 1, 1929 |
| 1,779,988 | Scott et al. | Oct. 28, 1930 |
| 1,795,013 | Denman | Mar. 3, 1931 |
| 2,193,972 | Lavenburg | Mar. 19, 1940 |
| 2,385,011 | Lurtz | Sept. 18, 1945 |
| 2,532,627 | Koci | Dec. 5, 1950 |
| 2,587,144 | Greeson | Feb. 26, 1952 |